US005337030A

United States Patent [19]

Mohler

[11] Patent Number: 5,337,030

[45] Date of Patent: Aug. 9, 1994

[54] PERMANENT MAGNET BRUSHLESS TORQUE ACTUATOR

[75] Inventor: David B. Mohler, Tipp City, Ohio

[73] Assignee: Lucas Industries, Inc., Reston, Va.

[21] Appl. No.: 957,862

[22] Filed: Oct. 8, 1992

[51] Int. Cl.$^5$ ........................ H02K 21/12; H02K 33/00

[52] U.S. Cl. ........................................ 310/156; 310/36; 310/154; 310/68 B

[58] Field of Search ................ 310/268, 36, 156, 68 B, 310/15, 266, 138, 154, 155, 259, DIG. 2

[56] References Cited

U.S. PATENT DOCUMENTS

| | | | |
|---|---|---|---|
| 3,435,394 | 3/1969 | Egger | 335/272 |
| 4,510,403 | 4/1985 | Vanderlaan et al. | 310/36 |
| 4,600,910 | 7/1986 | Vanderlaan | 310/36 X |
| 4,612,526 | 9/1986 | Vanderlaan et al. | 310/36 X |
| 4,795,929 | 1/1989 | Elgass et al. | 310/36 |
| 4,816,707 | 3/1989 | Vanderlaan | 310/36 |
| 4,883,981 | 11/1989 | Gerfast | 310/154 X |
| 5,038,063 | 8/1991 | Graber et al. | 310/115 |
| 5,038,064 | 8/1991 | Fiorenza | 310/116 |
| 5,142,181 | 8/1992 | Newell | 310/268 |

FOREIGN PATENT DOCUMENTS

| | | |
|---|---|---|
| 0175903 | 4/1986 | European Pat. Off. . |
| 0411563A1 | 2/1991 | European Pat. Off. . |
| 60-2064 | 1/1985 | Japan . |
| 63-87159 | 4/1988 | Japan . |
| 3-49577 | 3/1989 | Japan . |
| 1098084A | 6/1984 | U.S.S.R. . |
| 1478981 | 8/1974 | United Kingdom . |

OTHER PUBLICATIONS

European Search Report, 3 pages (Jan. 21, 1994).

*Primary Examiner*—Steven L. Stephan
*Assistant Examiner*—E. To
*Attorney, Agent, or Firm*—Nixon & Vanderhye

[57] ABSTRACT

A permanent magnet brushless torque actuator is comprised of an electromagnetic core capable of generating an elongated toroidally shaped magnet flux field when energized. Outside the generally cylindrical coil is an outer housing with upper and lower end plates at each end. Mounted to the end plates and extending towards each other are stator pole pieces separated from its opposing pole piece by an air gap. A permanent magnet rotor is disposed in the air gap and mounted on a shaft which in turn is rotatably mounted in each of the end plates. The permanent magnet rotor comprises at least two permanent magnets, each covering an arcuate portion of the rotor and having opposite polarities. Energization of the coil with current in one direction magnetizes the pole pieces such that each of the two pole pieces attracts one of the magnets of the rotor and repels the other magnet of the rotor resulting in a torque generated by the output shaft. Reversal of the current flow results in a reversal of the torque and rotation of the rotor in the opposite direction. Preferred embodiments are disclosed having multiple cells, i.e. a plurality of stator rotor stator combinations and/or cells in which there are a plurality of pole pieces at each stator pole plane.

26 Claims, 4 Drawing Sheets

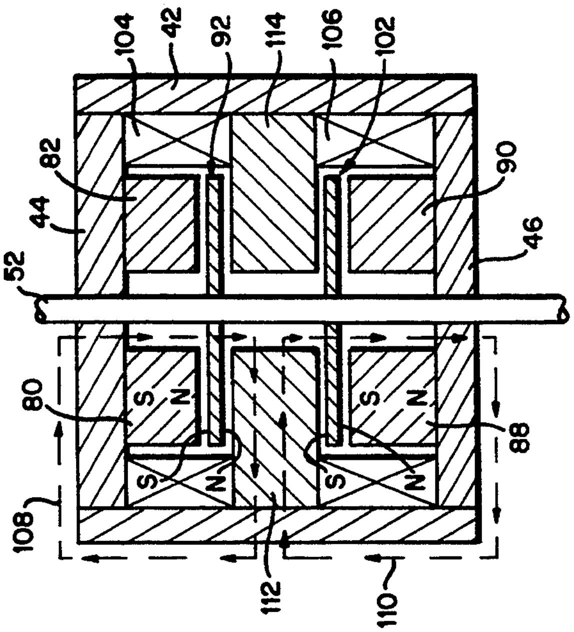
FIG. 7
FIG. 8
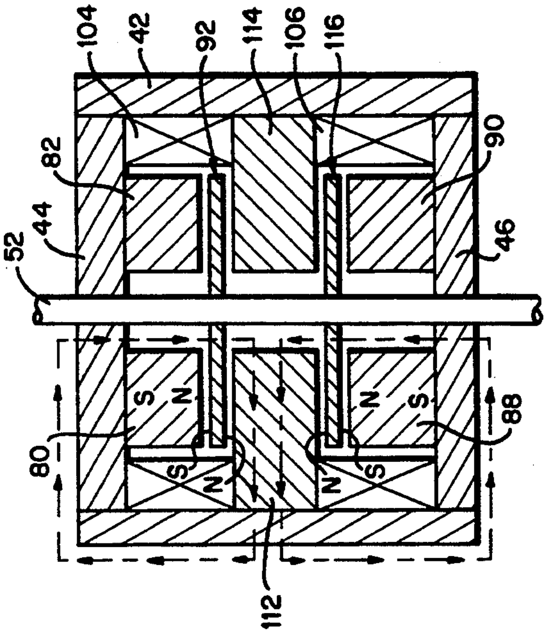
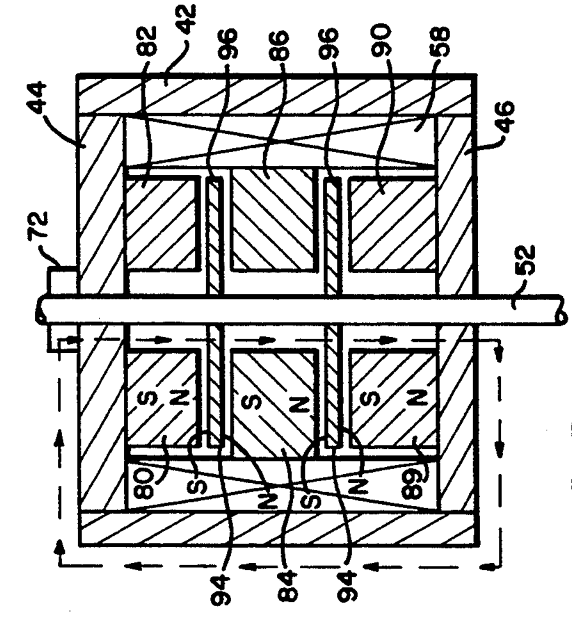
FIG. 6

PERMANENT MAGNET BRUSHLESS TORQUE ACTUATOR

BACKGROUND INVENTION

1. Field of the Invention

This invention relates to solenoid rotary actuators and, in particular, to a rotary actuator having an actuating coil and a permanent magnet rotor capable of bidirectional torque.

2. Discussion of Prior Art

U.S. Pat. No. 3,435,394 issued to Egger on Mar. 25, 1969 discloses a number of embodiments which can be described as electromagnetic control devices. Devices similar to these are now being marketed under the name brushless torque actuators by Lucas Ledex Inc. (the assignee of the present invention). These actuators generally comprise a single phase DC rotary solenoid incorporating a rotary element which is electrically operable in only one direction regardless of coil polarity. Upon energization of the electromagnet, the rotationally moveable pole piece is attracted to rotate to a position which minimizes the air gap over which flux has to flow in the electromagnetic circuit of the device. This causes a resultant rotation of the shaft in a predetermined direction.

Egger discloses a number of different rotor and stator configurations which provide a variety of torque versus angular rotation curves. The amount of rotation is based upon the torque generated and a spring which resists rotation. By changing the energization level of the coil, the device can be made to rotate a desired angular amount. Unfortunately, because Egger operates only upon the principle of increasing permeability (decreasing the air gap), it operates exactly the same regardless of the polarity of current flowing through the coil.

Another rotational actuator which has recently become available is that provided by Moving Magnet Technologies (MMT) of Besancon, France and is illustrated in FIGS. 1 and 2. The MMT actuator is a single phase DC coil actuator having a limited total rotational angle of approximately 110° and is bi-directional. The MMT is shown generally at 10 in FIG. 1 and in an exploded view in FIG. 2.

Separate coils 12 and 14 are wound around separate stators 16 and 18. The coils are wound and/or energized so as to polarize the stators in opposite directions. The stators and the end plate 20 are of ferrous material which is a good conductor of electromagnetic flux. The MMT actuator case 22 is a non-magnetic sleeve into which the coils may be bonded. An output shaft 24 has a pair of permanent magnets 26 and 28 bonded thereto. The shaft is mounted for rotation in base 20 and in sleeve 22 with appropriate bearings (not shown). The direction of polarization of both magnets 26 and 28 is parallel to the output shaft 24 and its axis of rotation. However, the polarization of magnet 26 is directly opposite the polarization of magnet 28. Also, connected to the output shaft and in contact with the magnets 26 and 28 is a ferrous flux carrier 30.

By review of FIG. 2, it can be seen that when there is no energization of the electromagnetic coils, there is essentially no net torque applied to the output shaft since permanent magnets 26 and 28 are merely attracted in the axial direction towards the stators 16 and 18. However, when the coils are energized so as to generate opposite polarity magnetic flux fields (as shown in FIG. 2), and when the junction between magnets 26 and 28 is directed generally towards the midpoint of stators 16 and 18, a net rotational force is generated on the output shaft.

The lower surface of the permanent magnet 26 has a "north" polarity and the upper surface of stator 16 has a "south" polarity and thus magnet 26 is attracted towards pole piece 16. Since the output shaft is constrained by bearings against axial movement, the shaft attempts to rotate so as to bring magnet 26 in line with stator 16. Also, a portion of magnet 28 also overlaps stator 16 but because they are of like polarity, magnet 28 will be repelled from stator 16. Thus, for stator 16, magnet 26 is attracted and magnet 28 is repelled and, because of the opposite polarity at stator 18, magnet 28 is attracted and magnet 26 is repelled. As a consequence, both magnets and both stators develop forces which result in a net rotation in the direction shown by arrows 32.

It can be seen that the magnetic flux path during energization of the MMT actuator, as illustrated in FIG. 2, is down through stator 16, across the ferromagnetic base, up through stator 18, across a working air gap, through the magnet 28, across the ferrous flux carrier 30, down through magnet 26, across a further working air gap and back to stator 16. Of course, should the current flow in electromagnetic coils 12 and 14 be reversed, the flux flow and the polarity at the top of stators 16 and 18 would be reversed and the rotational direction of the output shaft would also be reversed. Therefore, the MMT provides bi-directionality, dependent upon the energization direction of the electromagnet coils and also provides for an angular rotation of up to 90° in each direction (although in actuality, the rotation is only approximately 55°).

While the MMT actuator is an improvement over the Egger and other similar devices, because of the kidney shape of stators 16 and 18, to obtain the highest efficiency, coils 12 and 14 should be wound such that they conform to the kidney shape. Such a complex winding requires special handling and fixturing to form the coils properly. The coils can either be series or parallel wound. If the coils are series wound, the problems of coil winding are exacerbated although if they are parallel wound, two separate three wire connections will be necessary to connect the lead wires.

Also, there are disadvantages in the MMT actuator as a result of the requirement of flux carrier 30. This is necessary to close the magnetic flux circuit, as noted above, and must be mounted for rotation with the output shaft. Unfortunately, this ferrous material significantly increases the inertia of rotation and therefore the response of the actuator. The elimination of the ferrous flux carrier in the MMT would greatly reduce the torque available because the return path for the electromagnetic flux from the top of magnet 28 to the top of magnet 26 would be through air which has very poor flux conductivity. Therefore, the high inertia as a result of utilizing the ferrous flux carrier 30 is a consequence of the MMT actuator.

A further device which is of interest is the rotary actuator or magnetic spring disclosed in U.S. Pat. No. 5,038,063 issued to Graber et al on Aug. 6, 1991. Graber utilizes one shaft connected to a plurality of magnets where adjacent magnets have opposite polarities (just as in the MMT actuator). Sandwiching the plurality of magnets are magnetic pole pieces offset from each respecting opposing pole piece such that when energized, they tend to bias the position of the magnets with respect to the two disks of pole pieces. The strength of the magnets, the working air gaps involved, the stator pole offset angle and the external energization level serves to define the force tending to link the magnets with the pole pieces.

In a preferred embodiment, one shaft is connected to both sets of pole pieces and another shaft is connected to the magnets and the degree of coupling between the two shafts can be controlled by the energization level of the magnetic spring. It is noted that in the Graber device when operating as an actuator (or a magnetic spring for that matter), the poles as shown in FIGS. 4a through 4c are always displaced from each other and the junction between opposite polarity magnets in the rotor disk is never in line with the mid point of both upper and lower opposing stators. This offset (of one quarter pole pitch as discussed in column 3, line 63) is shown in each of Graber's Figures and is necessary in order to provide a magnetic "restoring (centering) force" as set forth in column 4, lines 16 through 23.

It is desirable to have a magnetically efficient brushless torque actuator which will operate in the fashion of an MMT actuator, i.e. is bi-directional depending upon the activating current but with relatively low inertia and therefore can respond quickly to changes in energizing current, amplitude or polarity.

SUMMARY OF THE INVENTION

In view of the above, it is an object of the present invention to provide a torque actuator having bi-directionality;

It is a further object of the present invention to provide a torque actuator having low rotational inertia;

It is a further object of the present invention to provide a torque actuator having a highly efficient magnetic flux path and, in particular, a magnetic flux path having two working air gaps per magnet as opposed to one working air gap per magnet in the MMT type actuator.

It is a still further object of the present invention to provide a torque actuator which, when actuated with either polarity of input voltage, has a predictable direction of travel away from any intermediate point in the stroke; i.e., is non-ambiguous so as to require some other bias means to effect a predictable torque or rotation.

It is an additional object of the present invention to provide a torque actuator which will stroke from either extreme of its travel to the opposite extreme in a smooth, continuous motion without intermediate discontinuities or magnetic detents in torque profile and without changing the voltage polarity.

The above and other objects are achieved by providing upper and lower stator pole pieces separated by a working gap. The pole pieces are aligned to be at the same general rotational location and disposed in the gap is a rotor comprising at least two permanent magnets mounted for rotation on an output shaft. The permanent magnets are polarized in directions parallel to the output shaft but in opposite directions. An electromagnetic coil generates a generally toroidal flux flow and is mounted outside the stator pole pieces but inside a magnetically permeable housing connecting the two stator pole pieces. When energized, in one direction the magnetic flux travelling from one stator pole piece through the permanent magnet rotor to the opposing pole piece generates attractive and repelling forces on the rotor, causing the output shaft to rotate such that the magnet is aligned with the appropriate polarity pole piece. A reversal of the current flow will result in the rotation of the output shaft in the opposite direction so that the other magnet is aligned with the stator pole pieces.

BRIEF DESCRIPTION OF THE DRAWINGS

The above and other advantages of the invention will become more apparent from the following description taken in conjunction with the accompanying drawings, wherein like references refer to like parts, wherein:

FIG. 6 is a side view partially in section of the dual rotor embodiment illustrated in FIG. 5;

FIG. 7 is a side view partially in section of a further embodiment of the dual rotor device shown in FIG. 6; and FIG. 8 is a side view partially in section of a still further embodiment of the dual rotor device shown in FIG. 6.

DETAILED DESCRIPTION OF THE PREFERRED EMBODIMENTS

Figure 1:
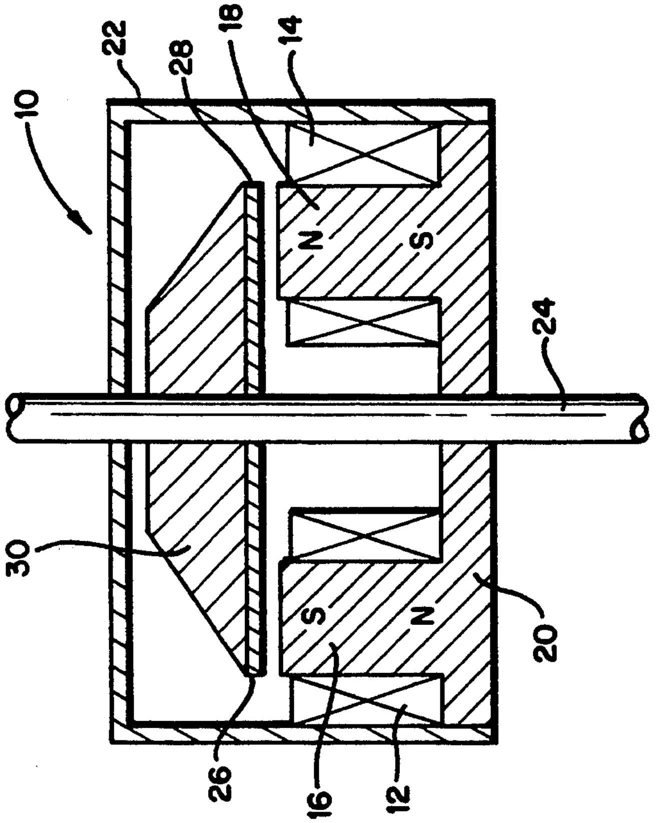
FIG. 1 (PRIOR ART)
FIG. 1 is a side view partially in section of a prior art MMT actuator.
Figure 2:
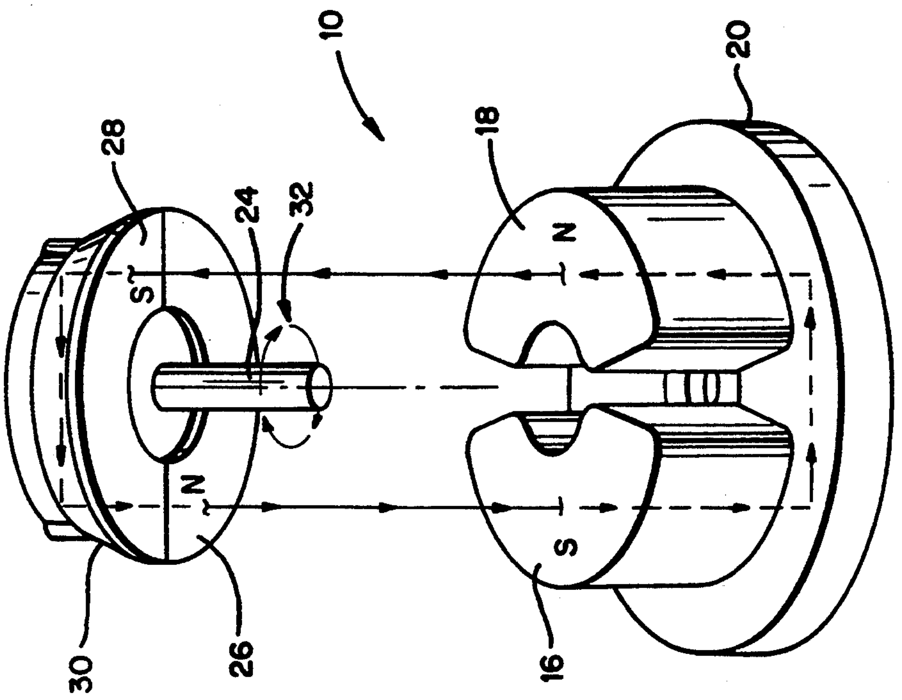
FIG. 2 (PRIOR ART)
FIG. 2 is a partially disassembled perspective view of the MMT actuator of FIG. 1.
Figure 4:
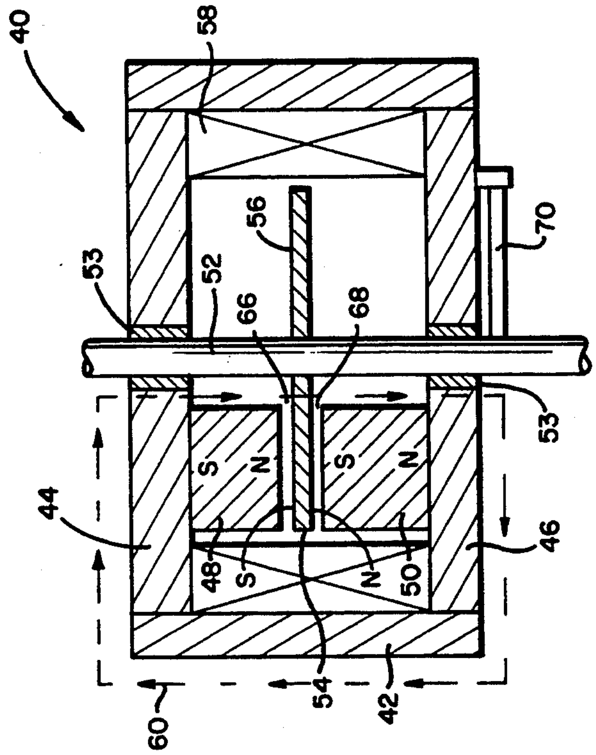
FIG. 4 is a side view partially in section of the present invention illustrated in FIG. 3.
Figure 3:
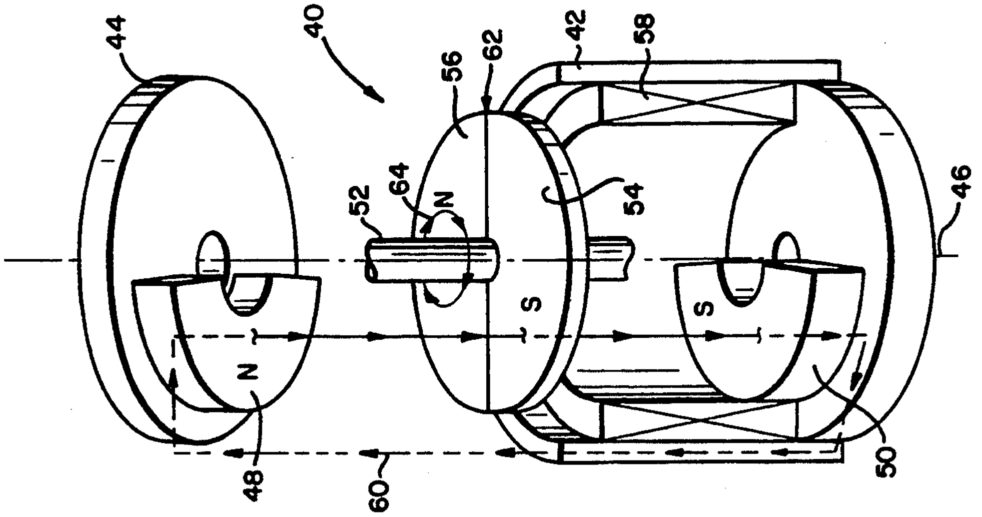
FIG. 3 is a partially disassembled perspective view of a permanent magnet torque actuator in accordance with the present invention.

FIGS. 1 and 2 relating to the MMT actuator have been discussed in detail. FIGS. 3 and 4 illustrate the present invention which is a permanent magnet brushless torque actuator (PMBTA) and is indicated generally by arrow 40. A magnetically conductive housing comprises sleeve 42 and upper and lower end plates 44 and 46, respectively. Included on the end plates are upper and lower stator pole pieces 48 and 50, respectively. It is important to note that both stator pole pieces are at substantially the same rotational position in the housing, i.e. they are opposite each other.

An output shaft 52 made of a low permeability material such as aluminum, plastics, etc. is mounted for rotation in bushings 53. Although not indicated, it is understood that these bushings permit rotational movement of the shaft but prevent axial movement of the output shaft. Attached to output shaft are two permanent magnets 54 and 56 which together comprise a magnetic rotor 62. In the FIGS. 3 and 4 embodiment, the permanent magnets are adjacent and together form a short cylindrical rotor which is fixed to and rotates with the output shaft 52. While the magnets are similar and indeed both are polarized in directions parallel to the axis of rotation of output shaft 52, the magnets are of opposite polarity.

A coil 58 in this embodiment surrounds both stator pole pieces and in turn is surrounded by sleeve 42 and bounded at the ends by the upper and lower end plates 44 and 46. As a result, when energized by current flow through in one direction, the coil generates an elongated but generally toroidal electromagnetic flux field in the direction shown by arrows 60 in FIGS. 3 and 4, i.e. down through lower stator pole piece 50, radially outward through lower end plate 46, upward through sleeve 42, radially inward through upper end plate 44, downward through upper stator pole piece 48, across a first working air gap, through the permanent magnet rotor 62, across a second working air gap and back to the lower stator pole piece 50 (the flux flow is internal to the sleeve, endplates and pole pieces but for clarity of understanding in FIG. 4, arrows 60 are located immediately external to these structures).

The operation of the PMBTA 40 is as follows. When the coil 58 is energized, as shown in FIGS. 3 and 4, the lower surface of the upper stator pole piece 48 has an "N" polarization and therefore tends to attract the "S" polarization of magnet 54 and repel the "N" polarization of magnet 56 causing output shaft 52 to rotate in the direction shown by arrows 64. Similarly, the lower surface of magnet 54 has an "N" polarization which is attracted towards the "S" polarization of lower stator pole piece 50. Further, the lower surface of magnet 56 has an "S" orientation which is repelled by the upper surface of lower stator pole piece 50. Thus, both permanent magnets also generate a torque in the direction of arrows 64 because of their attraction/repulsion with respect to the upper and lower pole pieces 48 and 50 tending to rotate output shaft 52 in the direction of arrows 64.

As can be seen in FIG. 4, with the exception of upper working air gap 66 and lower working air gap 68, the magnetic flux is completely contained within the outer sleeve, the two end plates and the pole pieces. Thus, in terms of electromagnetic flux generation and conduction, the PMBTA is extremely efficient and the only air gaps present are working air gaps which tend to generate the torsional force developed by shaft 52.

In one embodiment, a spring 70 can be pinned at one end to the lower end plate and connected at the other end to shaft 52 and serves to center the junction between magnets 54 and 56 adjacent the approximate mid portion of the stator pole pieces as seen in FIG. 3. This insures that the actuator is biased towards its center position in the event the coil 58 is deenergized. Of course, should the direction of current flow in coil 58 be reversed, then the flux flow directions shown in FIGS. 3 and 4 will also be reversed as will the rotational direction of shaft 52.

While the embodiment shown in FIG. 4 illustrates a spring tending to return the rotor to its center position (a position from which the rotor is free to move its maximum stroke in either direction), an alternative to a mechanical spring is the electronic position sensor which is well known in the art and represented by box 72 shown in FIG. 6. This is a position sensor which by electrostatic, electromagnetic, optical or other means senses the angular position of the output shaft 52 and, should the actual position differ from the desired position, an error signal is generated which can be processed to increase or decrease the current flow through the coil until there is either zero error or a predetermined level of error. This use of position feedback information to modulate the current flow through the coil is an alternative to a mechanical centering system for the present invention and in view of this discussion will be obvious to one or ordinary skill in the art.

The electromagnetic flux path of the invention can be optimized by minimizing the axial dimensions of the upper and lower working air gaps and by using an output shaft which has a very low permeability. Clearly, if the shaft had high permeability, it would serve as an additional conduction path for the electromagnetic flux generated by coil 58 by-passing the pole pieces and the permanent magnet rotor 62.

During energization of the coil in FIG. 3, it will be seen that, without any resisting force, the rotor 62 will rotate a theoretical maximum of 90° in the clockwise direction shown such that all of magnet 54 is interposed between the upper and lower stator pole pieces 48 and 50 respectively which then results in the least resistance to the magnetic flux flow. Similar movement in the opposite direction would occur when current flow in the coil is reversed. Accordingly, the device could theoretically have an operational range of ±90° from the center position (where the boundary between adjacent magnets is at a mid point of the opposed stator pole pieces). Practically speaking, the angular rotational range is plus or minus 55°.

If a shorter angular stroke is sufficient, a stronger torque can be created by increasing the number of magnets in the rotor 62 and increasing the upper and lower pole pieces accordingly. It can be seen by reviewing FIG. 3, that for a given cell (a cell comprises an upper plane with at least one upper stator pole piece, a lower plane with at least one lower stator pole piece and the plane of the rotor), the number of separate pole pieces will equal the number of separate magnets for magnet segments in the rotor.

Figure 5:
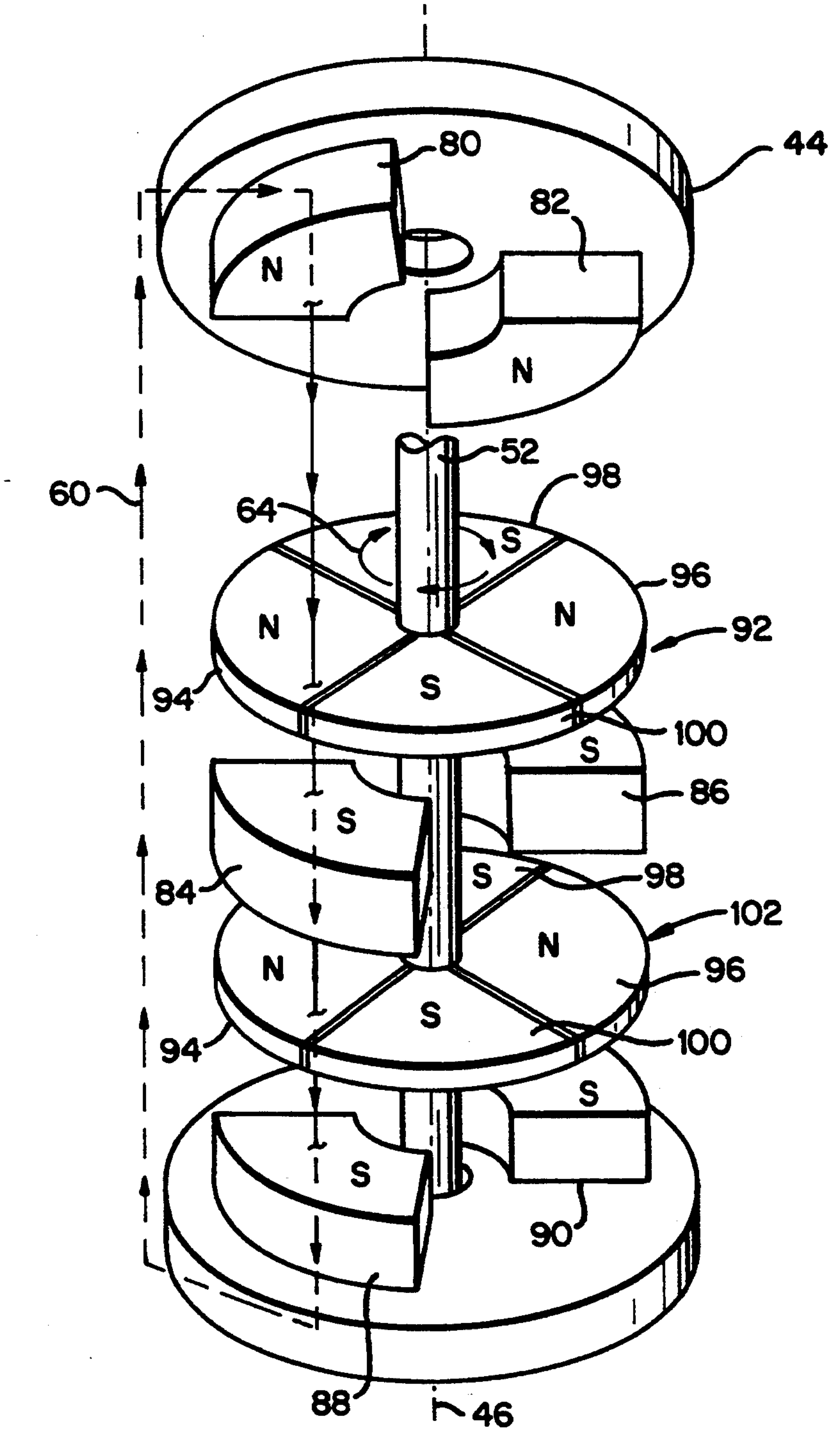
FIG. 5 is a partially disassembled perspective view of a dual rotor embodiment of the present invention.

FIGS. 5 and 6 illustrate a multi-cell embodiment. The outer sleeve and the electromagnet have been deleted for clarity of understanding. A two-cell device is shown where each cell comprises a rotor sandwiched between two pole pieces. In the embodiment shown there is also illustrated multiple stator pole pieces at each plane. Upper stator pole pieces 80 and 82 comprise an upper stator pole plane. Middle stator pole pieces 84 and 86 comprise a middle stator pole plane. Note that middle stator pole pieces 84 and 86 could be bonded at the appropriate internal location to the inner surface of coil 58. They could also be located in place by plastic sleeves sliding inside the inner surface of the electromagnetic coil or other similar constructions.

Lower stator pole pieces 88 and 90 comprise a lower stator pole plane. Upper rotor 92 is comprised of magnets 94 and 96 polarized in one axial direction and magnets 98 and 100 polarized in the opposite axial direction. The lower magnetic rotor 102 has similar magnets. As previously discussed, the upper stator plane, the upper magnetic rotor 92 and the middle stator plane comprise one cell and the middle stator pole plane, the lower magnetic rotor 102 and the lower stator pole plane comprise a second cell.

Examining the operation of a single cell of FIG. 5, it can be seen that, just as in FIG. 3, pole pieces in different planes are still substantially aligned as far as their rotational position, although each pole piece has only a 90° extent in the rotational direction. The rotor associated with the particular cell has four magnets where each adjacent magnet has an opposite polarity in its polarization, although all magnets are polarized with polarization directions parallel to the axis of rotation of output shaft 52.

The centered position of the rotor has the junction between magnets 94 and 100 in rotor 102 located adjacent the mid points of middle stator pole piece 84 and lower stator pole piece 88. Accordingly, energization of the coil to produce the flux field indicated by arrows 60 will generate torsional forces on output shaft 52 in the direction of arrows 64. However, it can be seen that the theoretical maximum angular rotation will only be 45° at which point magnet 100 will be aligned between middle pole piece 84 and lower pole piece 88. Similarly, if coil current flow is reversed such that the magnetic flux field is reversed, rotation will be in the opposite direction so that magnet segment 94 is perfectly aligned between middle stator pole piece 84 and lower stator pole piece 88.

The consequence of the increase of the number of stator pole pieces in a given plane is that the rotational torque would have a substantial increase as well. Accordingly, a one-called embodiment (i.e. half of the FIG. 5 device) would have a shorter stroke than the device shown in FIG. 3 but would have a substantial increase in torque. In FIG. 5, not only is the torque increased because of use of two pole pieces at each of the upper and lower planes and four magnets per cell, there is the combined torque of a total of two cells, the upper and lower cell as previously described. Each cell by itself would provide an increase in torque over the FIG. 3 embodiment and the combination of two cells would also provide a substantial increase in torque and the fact that both cells share the middle stator pole pieces does not diminish the generated torque.

Therefore, while the angular stroke of the FIG. 5 embodiment is approximately half that of the FIG. 3 embodiment, the torque available at output shaft 52 may well quadruple due to the doubling of the numbers of pole pieces in a cell and also due to the doubling of the number of cells. Similarly, if it is desirable to maintain the longer stroke of the FIG. 3 embodiment but increase the torque, then a two-cell version of FIG. 3 (with a single stator pole piece in each plane) would be advisable where the output torque would be increased by virtue of having a second magnetic rotor and a third stator.

FIG. 6 is a sectional view of the FIG. 5 embodiment in much the same manner that FIG. 4 is a sectional view of the FIG. 3 embodiment. FIGS. 5 and 6 illustrate two substantial changes from that illustrated in FIGS. 3 and 4, i.e. the use of multiple stator pole pieces in a stator pole plane for increased torque, and the use of multiple cells also for increased torque. Quite clearly, if a small angular stroke of operation can be tolerated, a greater number of stator pole pieces in a given pole piece plane will provide greater torque but at a cost of decreased angular stroke.

There is a relationship between the theoretical rotational stroke and the number of magnets and the number of stator pole pieces in a cell. If "n" is an integer, a theoretical stroke of $\pi/n$ is achieved with 2n adjacent magnets in the rotor and n stator pole pieces in each pole piece plane, where the pole piece plane sandwiches the rotor therebetween. It can be seen that this relationship holds for FIG. 3 which has $n=1$ pole pieces in each of two pole piece planes. There is only a single lower pole piece, a single upper pole piece and two adjacent magnets in the rotor. The theoretical angular stroke is equal to $\pi/n$ or $\pi$ radians which is 180° or ±90°.

If the above relationship is applied to a single cell device having two stators per stator pole plane, i.e. $n=2$ (this would be one cell of the two cell embodiment shown in FIG. 5), there would be four ($2\times n$) adjacent magnets and the angular stroke would be $\pi/2$ radians or 90° total or ±45°. It is noted that the addition of cells does not change the operational angular stroke but does increase the torque available over the existing stroke.

Fortunately the addition of extra cells does not double the weight of the device since even with additional cells, only a single coil is necessary, a single set of end plate bearings are necessary and the center or middle stator pole pieces serve double duty, i.e. they act against both adjacent magnetic rotors. Therefore, the weight of a two-cell embodiment would not normally be twice a single cell device.

Additionally, there is a relationship between the rotors and the stator planes in multiple cell embodiments. There is always one more stator plane than there are rotors. Therefore, if $\alpha$ is an integer representing the number of cells and the number of rotors in a PMBTA, then the number of stator planes is $\alpha+1$. In a single cell embodiment, such as FIGS. 3 and 4, $\alpha=1$ and the number of rotors is also equal $\alpha$, i.e. there is one rotor 62 in the FIG. 3 embodiment. The number of stator planes is $\alpha+1$, i.e. two and there are indeed two stator planes, one occupied by upper stator pole piece 48 and one occupied by lower stator pole piece 50.

The above relationship, as applied to the two-cell embodiment, $\alpha$ would equal 2. Accordingly, $\alpha$ equals 2 and also equals the number of rotors in the device. $\alpha+1$ equals 3 and there are indeed three stator planes. Thus, the multiple cell device can be characterized by $\alpha$ equaling the number of cells and the number of rotors with $\alpha+1$ indicating the number of stator planes.

If both the multiple pole piece relationship and the multiple cell relationship are combined, where n represents the number of stator pole pieces in a stator plane and $\alpha$ is the number of cells, the total number of pole pieces in the device will be $(\alpha+1)$ n pole pieces. The number of magnets in each rotor is equal to 2n and the total number of magnets is equal to $2\alpha n$. By simple substitution, the above relationships can be verified by reference to the examples shown in FIG. 3 and FIG. 5.

While the embodiments of FIGS. 3 through 6 utilize a single coil generating the flux flow indicated, multiple coils could also be used. The benefit of multiple coils would be an improved level of redundancy such that the device would still operate in the event one coil failed. This is particularly important in aerospace applications where such actuators may be utilized to control hydraulic valve assemblies which in turn control hydraulic actuators which operate the aerodynamic control surface.

FIG. 7 illustrates a multiple coil embodiment in which each cell has its own coil. Upper coil 104 serves to generate the electromagnetic flux field 108 and lower electromagnetic coil 106 generates lower flux field 110. It can be seen in this embodiment that where middle stator pole pieces 84 and 86 were previously mounted adjacent the inner edge of the coil, middle stator pole pieces 112 and 114 are connected to sleeve 42 thereby providing a separate electromagnetic flow path around each of the two coils. It may be advantageous in some embodiments to wind the two coils such that they occupy the same space as coil 58 in FIG. 6 so that (in the event one coil fails) electromagnetic flux generated by the remaining coil passes around the entire circuit as shown in FIG. 6.

FIG. 7 illustrates opposing radial flux flow in middle stator pole piece 14 which would be relatively small compared to the axial flux flow in the middle stator pole piece 112. Rotors 92 and 102 in FIG. 7, like FIG. 6, have the same polarization and generate torque in the same direction when coils 104 and 106 are energized so as to develop the upper and lower flux fields 108 and 110 as indicated. However, by reversing the polarity of one of the permanent magnet rotors and by reversing the magnetic flux flow field in the stator pole pieces adjacent the reversed rotor, a similar torque could be generated with directly opposite flux flow fields.

FIG. 8 illustrates a reversed flux flow embodiment. Assuming that coils 104 and 106 are wound in the same direction as the coils in FIG. 7, they generate opposite toroidally shaped magnetic flux fields because coil 106 is supplied with current moving in the opposite direction to that supplied to coil 104. This flux field generates in lower stator pole piece 88 an opposite polarity to that generated in upper stator pole piece 80 (see the reversal of the "north and south" poles between the two stator pole pieces).

In view of the reversed polarity of the lower pole pieces, in order to have torque of the same direction applied to output shaft 52, it is necessary that the corresponding magnets making up lower rotor 116 be reversed from the polarities in the upper rotor 92. Thus, the lower rotor 116 in FIG. 8 would have four permanent magnets like lower rotor 102 in FIG. 5 except the polarity of each magnet would be reversed. This reversal of polarity is illustrated by the lead lines "S" and "N" applied to the lefthand magnet in rotor 92 and the lead lines indicating "N" and "S" in the left most magnet of lower magnetic rotor 116.

It will be noted that, in the FIG. 8 embodiment, the magnetic flux flow through middle stator pole piece 112 is increased. Because of the reversal of the magnetic polarities in rotor 116 over that in rotor 92 and the reversal of the magnetic flux flow through stator pole pieces 88 and 112, the torque generated by rotor 116 is the same direction as the torque generated by rotor 92 and thus they would still add providing an increased torque over that achievable by a similar single celled actuator.

As noted above with respect to FIG. 4, the flux fields indicated by the arrows in FIGS. 6, 7 and 8 are internal to the sleeve, end plates and pole pieces but have been shown external thereto for clarity of illustration. In these embodiments, like that of FIG. 4, a non-magnetic flux conducting output shaft is desirable to avoid shorting out the various working air gaps which, in conjunction with the permanent magnets and the pole pieces, serve to generate the rotational torque.

It can be seen that the above embodiments of the present invention have distinct advantages over the MMT actuator in that the MMT has only a single air gap per magnet (the flux leaving the upper portion of one magnet is conducted radially over to the adjacent magnet by the ferrous flux carrier 30). Furthermore, at least two separate coils are required in order that the pole pieces in the MMT device have opposite polarities during current flow. This added complexity further increases the cost and reduces the efficiency of its operation.

The present invention discussed above overcomes the difficulties with the MMT actuator and others by providing true bi-directional operation by changing current flow direction in the actuating coils and, in preferred embodiments, can utilize a single cylindrically wound coil which generates an elongated toroidally shaped flux flow. The simplicity of construction and winding of a single such coil, as opposed to the two kidney shaped coils of the MMT device, results in a dramatic reduction in manufacturing cost. Further, the added efficiency of utilizing the permanent magnet rotor over two working air gaps per permanent magnet as opposed to a single working air gap per magnet in the MMT device provides an increase in electromagnetic efficiency.

Many modifications and embodiments of the permanent magnet brushless torque actuator will be apparent to those of ordinary skill in the art in view of the discussion and the attached Figures depending upon the particular torque and rotational stroke requirements. For example, extremely high torque devices may utilize a large number of cells or, where a relatively short stroke can be tolerated, may use a plurality of stator pole pieces in each stator pole plane. In fact, combinations of the two will result in even higher torque generating ability. Therefore, the present invention and the above discussion is by way of example only and the embodiments of the invention in which an exclusive property or privilege is claimed are set forth as follows:

What is claimed is:

1. A permanent magnet brushless torque actuator having a limited rotational motion in two directions, said actuator comprising:

an output shaft having an axis of rotation;

at least one permanent magnet rotor fixedly mounted on said output shaft, said at least one rotor having at least two adjacent magnets disposed at different rotational positions, each of said at least two magnets having a direction of magnetization parallel to said axis of rotation and opposite the direction of magnetization of an adjacent magnet;

magnetically conductive housing means including means for mounting said output shaft for rotation relative to said housing means about said axis of rotation, said housing means including at least two magnetically conductive stator pole pieces said at least two pole pieces comprising at least one pair, said at least one pair located at one aligned rotational position but said pole pieces in a pair located at different axial positions along said output shaft, said at least two pole pieces separated by said at least one rotor with one working air gap separating each of said at least two pole pieces from said at least one rotor; and coil means for generating a magnetic flux in a flux direction, said flux direction dependent upon the direction of current flow in said coil means, said flux flow direction passing through said housing means from one of said at least two stator pole pieces, across one of said working air gaps, through said at least one rotor, across another of said working air gaps, through another of said at least two stator pole pieces and back through said housing means.

2. A permanent magnet brushless torque actuator according to claim 1, further including rotation spring means for biasing said rotor towards a rest position where a boundary between adjacent magnets in said rotor is rotationally located towards a midportion of said at least two stator pole pieces.

3. A permanent magnet brushless torque actuator according to claim 1, further including position sensing means for sensing actual position of said output shaft and adjusting current flow through said coil to move said output shaft to a desired position.

4. A permanent magnet brushless torque actuator according to claim 1, wherein said at least one permanent magnet rotor comprises only one permanent magnet rotor.

5. A permanent magnet brushless torque actuator according to claim 1, wherein said at least one permanent magnet rotor comprises only two permanent magnets per rotor.

6. A permanent magnet brushless torque actuator according to claim 1, wherein each of said pole pieces extend along a rotational arc of about 180°.

7. A permanent magnet brushless torque actuator according to claim 1, wherein said at least two magnetically conductive stator pole pieces comprises two stator pole pieces.

8. A permanent magnet brushless torque actuator according to claim 1, wherein said housing means comprises a cylindrical sleeve and two endplates, each of said endplates closing one end of said sleeve, each endplate including at least one of said stator pole pieces.

9. A permanent magnet brushless torque actuator according to claim 1, wherein said coil means comprises a single cylindrically wound coil.

10. A permanent magnet brushless torque actuator according to claim 1, wherein said at least one permanent magnet rotor comprises only one permanent magnet rotor comprised of only two permanent magnets, said two permanent magnets having parallel but opposite polarization directions, said housing means comprises a cylindrical sleeve and two endplates, each of said endplates closing one end of said sleeve, each endplate including one of said stator pole pieces, wherein each of said pole pieces extend along a rotational arc of about 180°, and wherein said coil means comprises a single cylindrically wound coil located inside said sleeve and said endplates.

11. A permanent magnet brushless torque actuator having a limited rotational motion in two directions, said actuator comprising:

an output shaft having an axis of rotation;

one permanent magnet rotor fixedly mounted on said output shaft, said rotor having 2n adjacent magnets disposed around said output shaft at $\pi/n$ positions, where n is a positive integer, each of said 2n magnets having a direction of magnetization parallel to said axis of rotation and opposite the direction of magnetization of an adjacent magnet;

magnetically conductive housing means including means for mounting said output shaft for rotation relative to said housing means about said axis of rotation, said housing means including 2n magnetically conductive stator pole pieces with n stator pole pieces mounted in a first plane and n stator pole pieces mounted in a second plane, each pole piece extending along a rotational arc of $\pi/n$, said pole pieces in said first and second planes arranged in pairs, each pole piece in a pair located at aligned rotational positions while at different axial positions, said first and second planes separated by said rotor with one working air gap separating each of said pole pieces in each plane from said rotor; and coil means for generating a magnetic flux in a flux direction, said flux direction dependent upon the direction of current flow in said coil means, said flux flow direction passing through said housing means from one of said stator pole piece planes, across one of said working air gaps, through said rotor, across another of said working air gaps, through another of said stator pole piece planes and back through said housing means.

12. A permanent magnet brushless torque actuator according to claim 11, further including rotational spring means for biasing said rotor towards a rest position where a boundary between adjacent magnets in said rotor is rotationally located towards a midportion of said at least two stator pole pieces.

13. A permanent magnet brushless torque actuator according to claim 11, further including position sensing means for sensing actual position of said output shaft and adjusting current flow through said coil to move said output shaft to a desired position.

14. A permanent magnet brushless torque actuator according to claim 11, wherein said at least one permanent magnet rotor comprises only one permanent magnet rotor.

15. A permanent magnet brushless torque actuator according to claim 11, wherein n is 2 and said at least one permanent magnet rotor comprises only 4 permanent magnets per rotor, said 4 permanent magnets positioned around said output shaft at $\pi/2$ rotational positions, with 2 stator pole pieces in each of said first and second planes.

16. A permanent magnet brushless torque actuator according to claim 11, wherein n equals 2 and each of said pole pieces extend along a rotational arc of about $\pi/2$.

17. A permanent magnet brushless torque actuator according to claim 11, wherein said at least two magnetically conductive stator pole pieces comprise 4 stator pole pieces.

18. A permanent magnet brushless torque actuator according to claim 11, wherein n equals 2 and said housing means comprises a cylindrical sleeve and two endplates, each of said endplates closing one end of said sleeve, each endplate including two of said stator pole pieces.

19. A permanent magnet brushless torque actuator according to claim 11, wherein said coil means comprises single cylindrically wound coil.

20. A permanent magnet brushless torque actuator according to claim 11, wherein n equals 2 and said at least one permanent magnet rotor comprises only one permanent magnet rotor comprised of only 4 permanent magnets, said 4 permanent magnets having parallel but opposite polarization directions, said housing means comprises a cylindrical sleeve and two endplates, each of said endplates closing one end of said sleeve, each endplate including two of said stator pole pieces, wherein each of said pole pieces extend along a rotational arc of about 90°, and wherein said coil means comprises a single cylindrically wound coil located inside said sleeve and said endplates.

21. A permanent magnet brushless torque actuator having a limited rotational motion in two directions, said actuator comprising:

an output shaft having an axis of rotation;

$\alpha$ permanent magnet rotors fixedly mounted on said output shaft where $\alpha$ is a positive integer, each of said rotors having 2n adjacent magnets disposed at $\pi/n$ rotational positions where n is a positive integer, each of said 2n magnets having a direction of magnetization parallel to said axis of rotation and opposite the direction of magnetization of an adjacent magnet;

magnetically conductive housing means including means for mounting said output shaft for rotation relative to said housing means about said axis of rotation, said housing means having $(\alpha+1)n$ stator pole pieces with n pole pieces mounted in $\alpha+1$ planes, each pole piece extending along a rotational arc of $\pi/n$, said pole pieces in corresponding $\alpha+1$ planes located at aligned rotational positions while at $\alpha+1$ different axial positions, each of said planes separated from an axially adjacent planes by a corresponding rotor with at least one working air gap separating each of said pole pieces in each plane from said rotor; and coil means for generating a magnetic flux in a flux direction, said flux direction dependent upon the direction of current flow in said coil means, said flux flow direction passing through said housing means from the first of said stator pole piece planes, across one of said working air gaps, through said alternating rotors and stators and their respective working air gaps, through the last of said stator pole piece planes and back through said housing means.

22. A permanent magnet brushless torque actuator according to claim 21, further including rotational spring means for biasing said rotor towards a rest position where a boundary between adjacent magnets in said rotor is rotationally located towards a midportion of said at least two stator pole pieces.

23. A permanent magnet brushless torque actuator according to claim 21, further including position sensing means for sensing actual position of said output shaft and adjusting current flow through said coil to move said output shaft to a desired position.

24. A permanent magnet brushless torque actuator according to claim 21, wherein $\alpha$ is equal to 2.

25. A permanent magnet brushless torque actuator according to claim 21, wherein n is equal to 2.

26. A permanent magnet brushless torque actuator according to claim 21, wherein both $\alpha$ and n are each equal to 2.

* * * * *